(12) United States Patent
Lin et al.

(10) Patent No.: US 8,416,489 B2
(45) Date of Patent: Apr. 9, 2013

(54) WHITE LIGHT SOURCE WITH CRYSTAL FIBER AND METHOD FOR COLOR TEMPERATURE TUNING THEREOF

(75) Inventors: Yen-Sheng Lin, Taipei (TW); Chien-Chung Tsai, Taipei (TW); Tzu-Chieh Cheng, Taipei (TW); Kuang-Yu Hsu, Taipei (TW); Dong-Yo Jheng, Taipei (TW); Sheng-Lung Huang, Taipei (TW)

(73) Assignee: National Taiwan University, Taipei (TW)

( * ) Notice: Subject to any disclaimer, the term of this patent is extended or adjusted under 35 U.S.C. 154(b) by 301 days.

(21) Appl. No.: 12/752,545

(22) Filed: Apr. 1, 2010

(65) Prior Publication Data

US 2011/0128611 A1    Jun. 2, 2011

(30) Foreign Application Priority Data

Dec. 2, 2009  (TW) ................ 98141154 A

(51) Int. Cl.
  *G02F 1/35*   (2006.01)
  *H01S 3/10*   (2006.01)
(52) U.S. Cl. .............. 359/326; 372/6; 372/22; 372/101; 385/34
(58) Field of Classification Search .................... None
  See application file for complete search history.

(56) References Cited

U.S. PATENT DOCUMENTS

| 5,410,413 | A | 4/1995 | Sela |
| 7,557,985 | B2 * | 7/2009 | Hama et al. .............. 359/326 |
| 7,920,605 | B2 * | 4/2011 | Jhang et al. .............. 372/6 |
| 2005/0201427 | A1 * | 9/2005 | Luo et al. .............. 372/23 |
| 2006/0002433 | A1 | 1/2006 | Huang et al. |
| 2007/0122103 | A1 * | 5/2007 | Yamazaki et al. .............. 385/142 |
| 2007/0189338 | A1 | 8/2007 | Seelert et al. |
| 2007/0189343 | A1 * | 8/2007 | Seelert et al. .............. 372/22 |
| 2009/0067453 | A1 * | 3/2009 | Mizuuchi et al. .............. 372/6 |

OTHER PUBLICATIONS

Yen-Sheng Lin, High-Brightness White Light Point Source Using Ce,Sm:YAG Crystal Fiber, 2009 OSA/CLEO/IQEC, JThE39, Jun. 2, 2009, Baltimore, Maryland.
Yen-Sheng Lin, Crystal Fiber Based White Light Source Using Ce,Sm:YAG as the Active Medium, 2008 OSA/CLEO, JThA74, May 4, 2008, San Jose, California.

* cited by examiner

*Primary Examiner* — Hemang Sanghavi
(74) *Attorney, Agent, or Firm* — Muncy, Geissler, Olds & Lowe, PLLC

(57) ABSTRACT

The present invention relates to a white light source, and particularly to a white light source with crystal fiber and a method for color temperature tuning thereof. The white light source of the present invention comprises a pumping source for providing a first-color light, and a gradient index lens for coupling the first-color light into a crystal fiber. The crystal fiber absorbs a portion of the first-color light and generates a second-color light and a third-color light, and a white light with high color rendering index can be obtained. The crystal fiber is made of a first rare earth element oxide and a second rare earth element oxide co-doped yttrium aluminum garnet. The color temperature of the white light can be tuned by adjusting the position of the focus of the pumping light on the end section of the crystal fiber.

7 Claims, 8 Drawing Sheets

WHITE LIGHT SOURCE WITH CRYSTAL FIBER AND METHOD FOR COLOR TEMPERATURE TUNING THEREOF

FIELD OF THE INVENTION

The present invention is related to a white light source, and particularly to a white light source with a wave-guided crystal fiber and a method for color temperature tuning thereof.

BACKGROUND

In recent years, the photonics industry is developing vigorously, making great progress in various areas including image display, signal transmission, and lightings.

In the field of lightings, the light source required in most of cases is a white light source. A tungsten lamp used in the past is eliminated gradually due to high power consumption and poor luminous efficiency. Nowadays, there are many kinds of ways to generate the white light source, in which the way that a blue laser diode is used as a pumping source, and yellow phosphor is plated onto the outside of the lampshade, may be more commonly used. When a blue light emitted from the blue laser diode passes through the lampshade, a portion of blue light may be absorbed by the yellow phosphor to generate a yellow light complementary to the blue light. Then, a white light is generated by means of color mixture.

The problem of a lower luminous efficiency occurs in the presently commercially available white light source, however, owing to the restriction of a smaller light-emitting area of the blue laser diode. Moreover, such a white light source obtained by the mixture of two colors is composed of only two monochromatic light waves, in such a way that the spectrum distribution is monotonous, resulting in a poorer color rendering index (CRI) with more restricted fields of application.

A general white LED lighting lamp is not satisfactory in the place, where a higher CRI of lighting source is required, such as a printing industry, textile factories, hotels, shops, hospitals, schools, precision machining factories, office buildings, and houses, for example. The requirement for higher CRI of light source is even needed more in the field applications including color inspection, clinical diagnosis, and art gallery lighting.

SUMMARY OF THE INVENTION

It is one objective of the present invention to provide a white light source, and particularly to provide a white light source with a wave-guided crystal fiber, and a method for color temperature tuning thereof.

It is another objective of the present invention to provide a white light source with crystal fiber, which comprises a pumping source for providing a first-color light, and a crystal fiber for absorbing a portion of the first-color light to generate a second-color light and a third-color light. Thus, these lights may be mixed to form a white light with a high color rendering index (CRI).

It is a further objective of the present invention to provide a white light source with crystal fiber, wherein a gradient index (GRIN) lens is used to couple the pumping light into the crystal fiber, so as to increase the luminance significantly.

It is a further objective of the present invention to provide a white light source with crystal fiber, wherein the pumping source comprises a blue laser diode used for providing a blue light as the first-color light.

It is a further objective of the present invention to provide a white light source with crystal fiber, wherein the crystal fiber is a Ce,Sm:YAG crystal fiber which can absorb the blue light and then generate a yellow light and a red light. When propagating along the fiber, the yellow and red lights are collected and amplified.

It is a further objective of the present invention to provide a white light source with crystal fiber, wherein the crystal fiber is selected from a single cladding crystal fiber or a double cladding crystal fiber, so as to facilitate the light coupling with a back-end element.

It is a further objective of the present invention to provide a white light source with crystal fiber, wherein the crystal fiber can be made as a tapered crystal fiber if required.

It is a further objective of the present invention to provide a white light source with crystal fiber, wherein the crystal fiber is a rare earth element oxides co-doped yttrium aluminum garnet (YAG) crystal fiber.

It is another objective of the present invention to provide a white light source with crystal fiber, wherein the pumping source is selected from one of the followings: a frequency doubling laser, a laser diode, and a light-emitting diode.

It is a further objective of the present invention to provide a method for color temperature tuning of white light source with crystal fiber by adjusting the position of the focus of the pumping light on the end section of the crystal fiber, so the color temperature of the white light can be tuned.

The present invention therefore provides a white light source with crystal fiber which comprises a pumping source for providing a first-color light as a pumping light; a crystal fiber for absorbing a portion of the first-color light to generate a second-color light and a third-color light; and a gradient index lens for coupling the first-color light into the crystal fiber, wherein the first-color light, the second-color light, and the third-color light are mixed to form a white light.

The present invention further provides a method for color temperature tuning of white light source with crystal fiber comprising the steps of providing a pumping source for generating a first-color light; providing a crystal fiber for absorbing a portion of the first-color light and generating a second-color light and a third-color light, wherein the first-color light, the second-color light, and the third-color light are mixed to form a white light; providing a gradient index lens for focusing the first-color light on the end section of the crystal fiber; and adjusting the position of the focus of the first-color light on the end section of the crystal fiber so the color temperature of the white light can be tuned.

DETAILED DESCRIPTION

Figure 1:
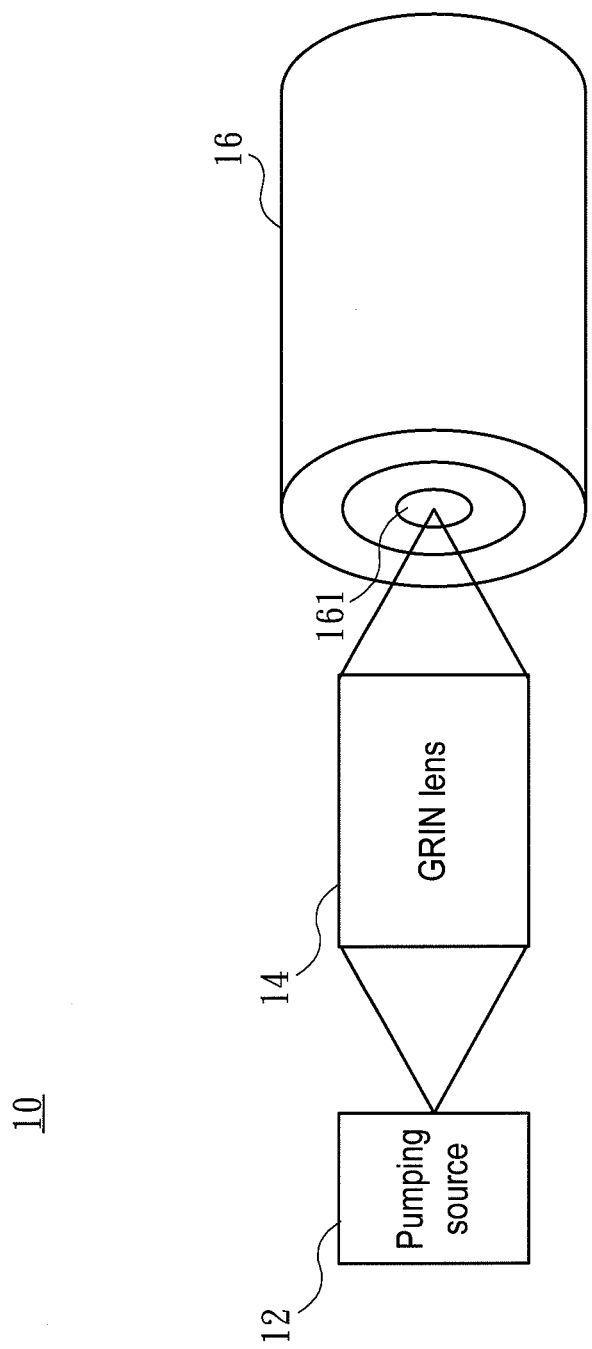
FIG. 1 is a schematic diagram of a white light source with crystal fiber in accordance with one embodiment of the present invention.

Referring to FIG. 1, there is shown a schematic diagram of a white light source with crystal fiber in accordance with one embodiment of the present invention. The white light source with crystal fiber 10 of the present invention comprises a pumping source 12, a gradient index (GRIN) lens 14, and a crystal fiber 16.

The pumping source 12 provides a pumping light. The pumping light is selected to be in the range of visible light in the present invention, such as a first-color light. The crystal fiber 16 can absorb a portion of the first-color light, and then generates a second-color light and a third-color light each different to the first-color light. A white light with high color rendering index (CRI) can be obtained by means of mixing the first-color light, the second-color light, and the third-color light.

In the present embodiment, the pumping source 12 is selected to be a blue laser diode, and the first-color light is a blue light. The crystal fiber 16 absorbs a portion of the blue light and then generates the second-color light and the third-color light, such as yellow light and red light respectively. By mixing the complementary color lights, the blue light and the yellow light, a white light can be obtained. And by adding the red light into the white light at an appropriate percentage, the CRI of the white light can be improved, thus the field of application of this white light source will be enlarged.

For improving the light coupling efficiency between the pumping source 12 and the crystal fiber 16, the GRIN lens 14 is disposed in between the pumping source 12 and the crystal fiber 16 for focusing the pumping light onto a predetermined position, such as a core 161, on the end section of the crystal fiber 16. By using the GRIN lens 14 for light coupling, the luminance of the white light generated by the white light source with crystal fiber 10 can be improved significantly.

Apart for the laser diode, a frequency doubling laser or a light-emitting diode can also be used as the pumping source 12 to provide the pumping light.

Figure 2:
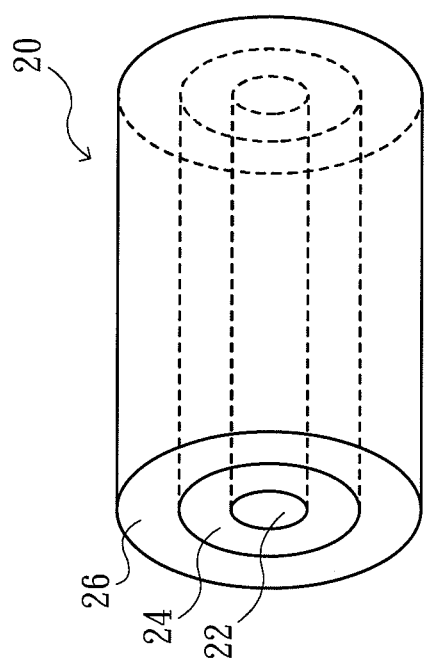
FIG. 2 is a schematic diagram of the structure of a crystal fiber in accordance with one embodiment of the present invention.

Now referring to FIG. 2, there is shown a schematic diagram of a crystal fiber 20 in accordance with one embodiment of the present invention. The crystal fiber of the present invention is selected from either a double cladding crystal fiber or a single cladding crystal fiber depending on the application and the back-end element. The present embodiment of the crystal fiber is a double cladding crystal fiber 20. The double cladding crystal fiber 20 comprises a core 22, an inner cladding 24, and an outer cladding 26.

The core 22 is a single crystal rod made of a first rare earth element oxide and a second rare earth element oxide co-doped yttrium aluminum garnet (YAG). The inner cladding 24 is made of the eutectoid composite of the material of the core 22 and silicon dioxide, while the outer cladding 26 is a silicon dioxide cladding.

The first rare earth element oxide and the second rare earth element oxide are each selected from cerium oxide, praseodymium oxide, samarium oxide, europium oxide, or terbium oxide.

When the pumping light projects onto the core 22 or the inner cladding 24 of the double cladding crystal fiber 20, the two different rare earth ions thereof absorb a portion of the first-color light, and then generate the second-color light and the third-color light respectively. Thereby, three color lights are mixed to form a white light with high luminance.

Taking cerium (Ce) oxide and samarium (Sm) oxide as an example, the core 22 is a single crystal rod of Ce,Sm:YAG formed of cerium oxide and samarium oxide co-doped yttrium aluminum garnet. When the blue light is projected onto the core 22 of the double cladding crystal fiber 20, the cerium ions in the core 22 will be excited to emit the yellow light, the samarium ions absorbs a portion of the yellow light and generates the red light. The blue light and the yellow light are mixed to obtain a white light with high luminance. By adding the red light with an appropriate percentage, the CRI of the white light can be highly improved.

In the double cladding crystal fiber 20, the refractive index of the core is the greatest, that of the inner cladding is the secondary, and that of the outer cladding is the smallest. Because of the refraction indices of each layer, light propagates in the crystal fiber with the behavior similar to that of optical waveguide. This reduces the propagation loss of light, and improves the effect of amplified spontaneous emission. Therefore, by using the double cladding crystal fiber 20 of the present invention, a higher light conversion efficiency and luminous efficiency are achieved.

Figure 3:
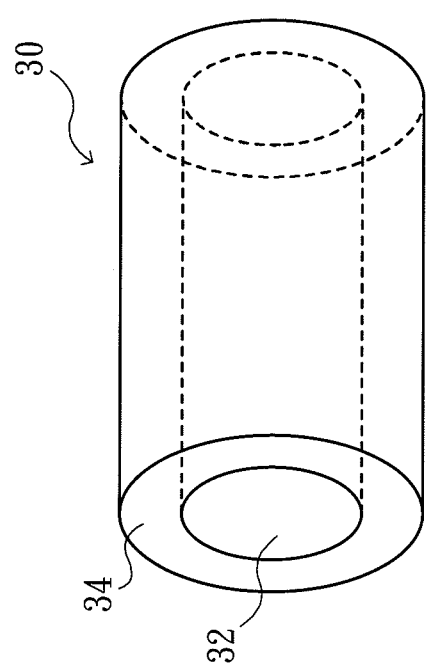
FIG. 3 is a schematic diagram of the structure of a crystal fiber in accordance with another embodiment of the present invention.

Referring to FIG. 3, there is shown a schematic diagram of a crystal fiber in accordance with another embodiment of the present invention. In the present embodiment, the crystal fiber is a single cladding crystal fiber 30, comprising a core 32 and an outer cladding 34.

The core 32 is made of a eutectoid composite of a YAG, a first rare earth element oxide, a second rare earth element oxide, and silicon dioxide, the outer cladding 34 is a silicon dioxide cladding.

The first rare earth element oxide and the second rare earth element oxide are each selected from cerium oxide, praseodymium oxide, samarium oxide, europium oxide, or terbium oxide.

The refractive index of the core 32 is greater than that of the outer cladding 34. In such a structure, the single cladding crystal fiber 30 comprises the property of an optical waveguide. The effect of amplified spontaneous emissions can also be improved by using the single cladding crystal fiber 30 of the present invention. Due to a different structure, however, the single cladding crystal fiber 30 may be formed with a core 32 having a larger diameter. And it is suitable for a wide range lighting application.

Figure 4:
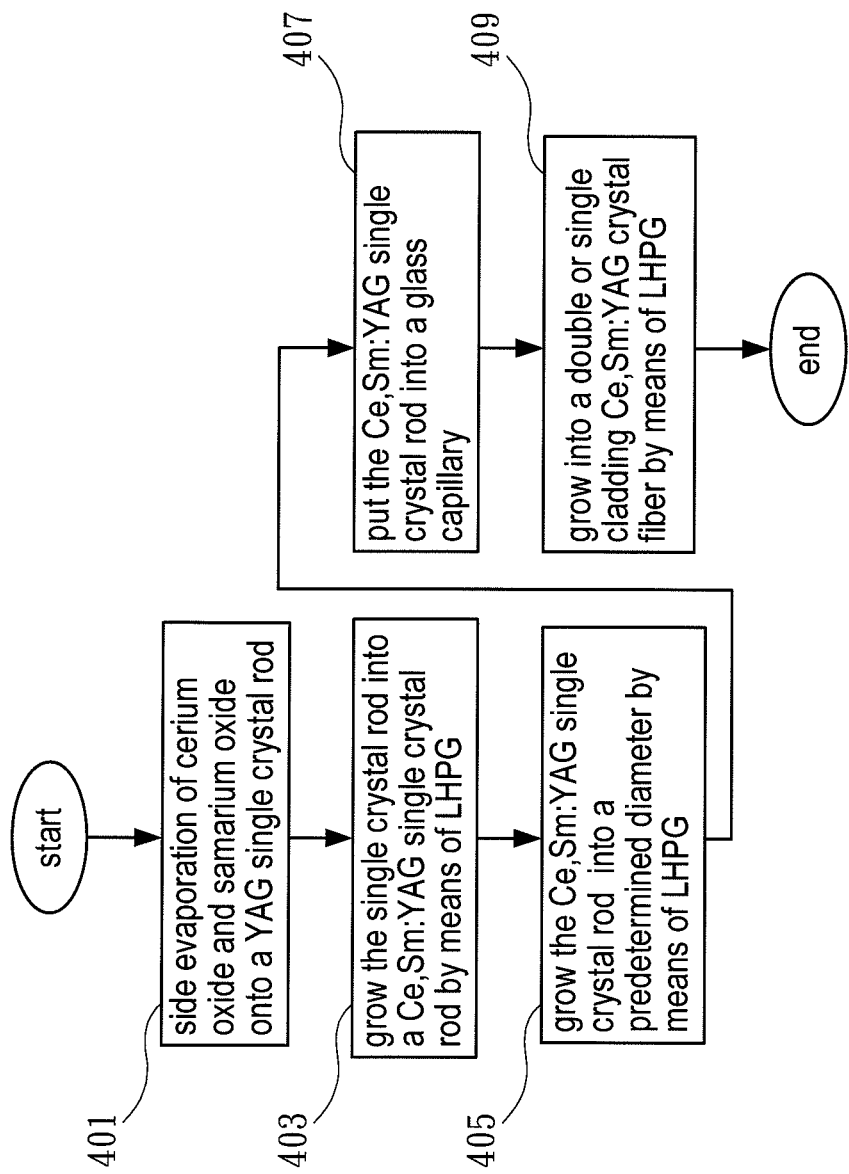
FIG. 4 is a flow chart of a fabrication method for the crystal fiber in accordance with one embodiment of the present invention.

Referring to FIG. 4, there is shown a flow chart of a fabrication method for the crystal fiber in accordance with one embodiment of the present invention. Taking Ce,Sm:YAG as an example, the fabrication method for the crystal fiber of the present invention comprises the steps as follows. A YAG single crystal rod is firstly provided, and then cerium oxide and samarium oxide are evaporated onto the side of the YAG single crystal rod, as shown in Step 401. After the side evaporation is completed, the single crystal rod is grown by means of laser-heated pedestal growth (LHPG) method with a diameter reduction ratio of 1:1. In this process, cerium ions and samarium ions will permeate into the interior of the single crystal rod to form a Ce,Sm:YAG single crystal rod, as shown in Step 403.

Cutting a Ce,Sm:YAG block into the single crystal rod may be used directly instead of Steps 401 and 403.

The Ce,Sm:YAG single crystal rod may be grown into a single crystal rod with a proper diameter (for example, 70 μm) by means of LHPG, as shown in Step 405. Subsequently, this single crystal rod is put into a glass capillary with a proper caliber (for example, an inner diameter of 76 μm and an outer diameter of 320 μm), as shown in Step 407.

Finally, the Ce,Sm:YAG single crystal rod enclosed by the glass capillary is grown into a single or double cladding crystal fiber having a target diameter by means of LHPG, as shown in Step 409.

If the crystal fiber is made in the form of a double cladding, the core thereof is then made of co-doped Ce,Sm:YAG with a diameter in the range of 5 to 50 μm. The inner cladding is made of a eutectoid composite of Ce,Sm:YAG and silicon dioxide with a diameter of approximately 100 μm, and the outer cladding is a silicon dioxide cladding with a diameter of approximately 320 μm.

If the crystal fiber is made in the form of a single cladding, the core thereof is then made of a eutectoid composite of co-doped Ce,Sm:YAG and silicon dioxide with a diameter in the range of 10 to 300 μm as required. The outer cladding is a silicon dioxide cladding with a diameter in the range of 320 to 500 μm as required.

Figure 5:
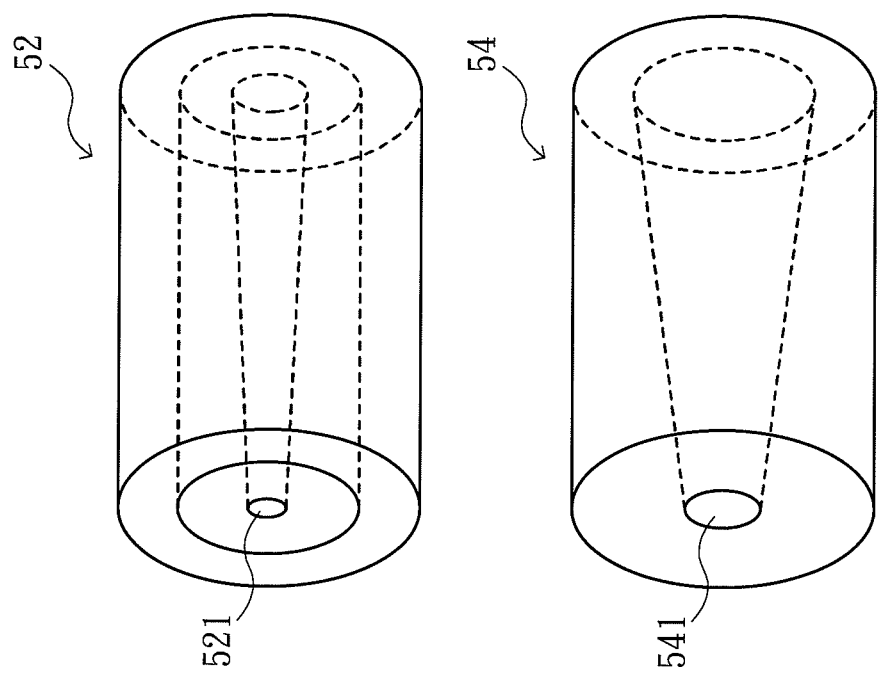
FIG. 5 is a schematic diagram of the structure of a crystal fiber in accordance with another embodiment of the present invention.

FIG. 5 is a schematic diagram of a crystal fiber in accordance with another embodiment of the present invention. In this embodiment, either a double cladding crystal fiber 52 or a single cladding fiber 54 may be made as a tapered crystal fiber if required. The diameter of the core 521, 541 increases gradually from a smaller one to a larger one, or decrease gradually from a larger one to a smaller one for the application between the front-end element and the back-end element with different requirements for light coupling.

Figure 6:
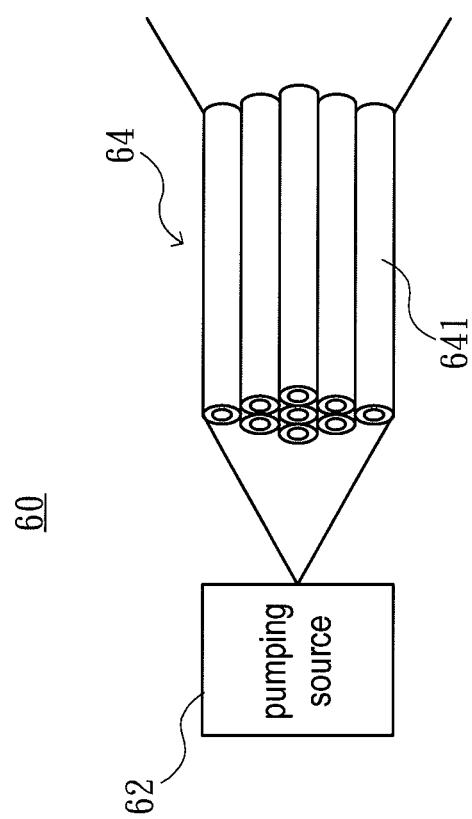
FIG. 6 is a schematic diagram of a white light source with crystal fiber in accordance with another embodiment of the present invention.

Referring to FIG. 6, there is shown a schematic diagram of a white light source with crystal fiber in accordance with another embodiment of the present invention. When a white light source with crystal fiber 60 of the present invention is used for a larger area lighting, a plurality of crystal fibers 641 can be gathered as a crystal fiber bundle 64, and a pumping light generated by a pumping source 62 is projected onto one end of the crystal fiber bundle 64. The lighting for a large area can be achieved, due to the white light generated by the plurality of crystal fibers 641 of the crystal fiber bundle 64.

Figure 7:
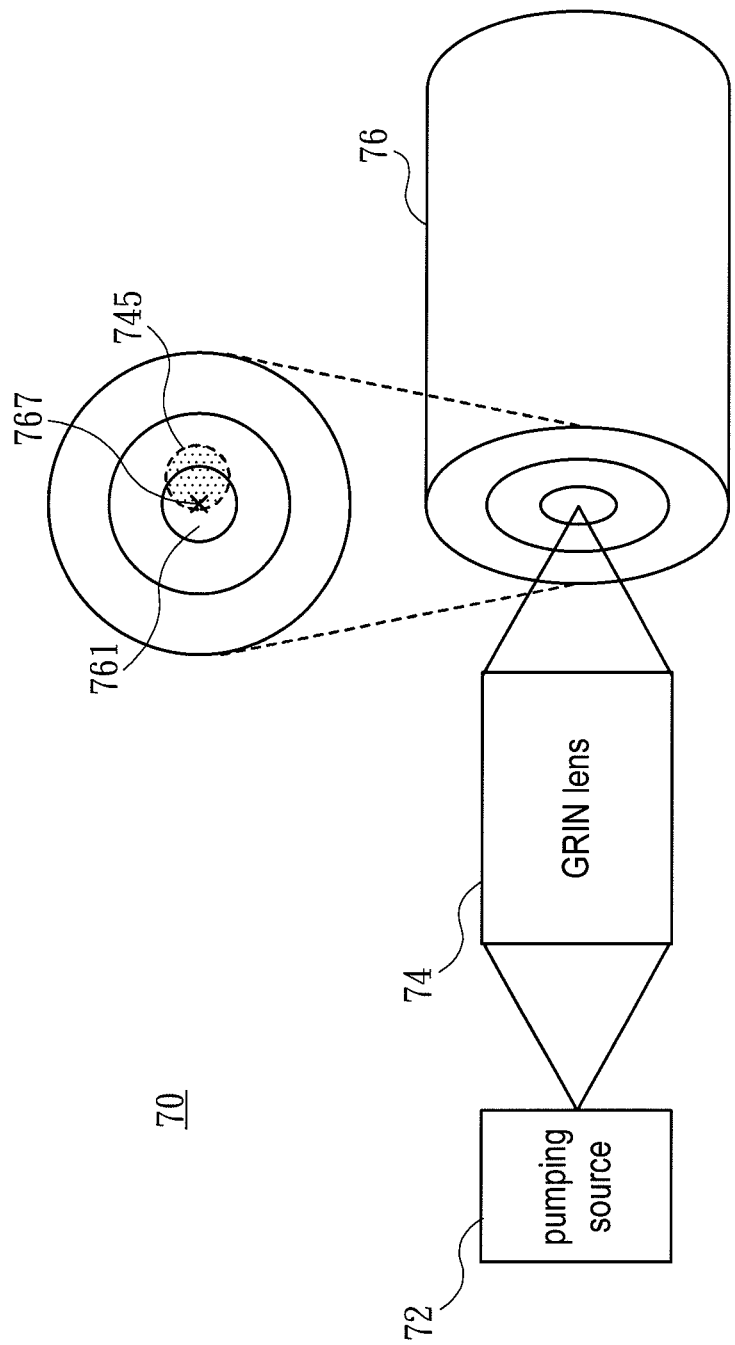
FIG. 7 is a schematic diagram of the color temperature tuning for the white light source with crystal fiber in accordance with one embodiment of the present invention.

Referring to FIG. 7, there is shown a schematic diagram of the color temperature tuning for the white light source with crystal fiber in accordance with one embodiment of the present invention. In general, warm colors (for example, from yellow to orange, or from red to purplish red) may give a visual sensation of closing to the observer with warm feeling, cold colors (for example, from blue violet to blue, or from blue-green to yellow-green) give a visual sensation of far from the observer with chilly feeling. Moreover, color tones of the light may be also used to give different sense impressions. The psychological feeling of the observer to one white light may be also affected when its color temperature is varied.

A white light source with crystal fiber 70 of the present invention may be provided with a function for color temperature tuning.

A method for color temperature tuning for the white light source with crystal fiber 70 of the present invention comprises the steps as follows. Firstly, provide a pumping source 72 for generating a first-color light. Secondly, provide a crystal fiber 76 for absorbing a portion of the first-color light and then generating a second-color light and a third-color light, these lights being mixed to form a white light.

A GRIN lens 74 is provided for focusing the first-color light onto the end section of the crystal fiber 76. Subsequently, adjust the position of the focus of the first-color light on the end section of the crystal fiber 76. The color temperature of the white light will be varied by means of changing the relative position between the focus and the axis 767 of the crystal fiber 76.

The crystal fiber 76 is a crystal fiber made of a first rare earth element oxide and a second rare earth element oxide co-doped yttrium aluminum garnet in the form of a single or double cladding one.

In the fabrication process of the crystal fiber, there is a property of the rare earth ions to permeate toward the axis 767 of the single crystal rod. Thus, in the crystal fiber 76, the concentration of the rare earth ions decreases gradually and outwardly from a maximum at the axis 767, i.e., the concentration of the rare earth ions at the axis 767 is higher than that in the peripheral portion.

Therefore, when the focus 745 of the first-color light lies in the region of the core 761 completely, or covers the maximal region around the axis 767, more first-color light will be absorbed, and more second-color light and third-color light will be generated, due to a higher concentration of rare earth ions. As the focus 745 of the first-color light moves outwardly from the axis 767, the intensity of the first-color light passing through the crystal fiber 76 increases, and the intensity of the second-color light and third-color light reduce accordingly, due to the reduced concentration of rare earth ions. With such a property, the color temperature of the white light generated by the white light source with crystal fiber 70 can be adjusted.

Taking the blue pumping light with Ce,Sm:YAG single crystal fiber as an example, when the focus 745 of the blue pumping light is closed to the central portion of the core 761, i.e., covers the maximal region around the axis 767, a higher absorption rate with respect to blue light is provided by the crystal fiber 76. Therefore, the intensity of the blue light decreases, and the intensity of yellow light and red light increase accordingly. Thus the white light generated by the white light source comprises low color temperature. On the contrary, when the focus 745 moves outwardly from the axis 767, the absorption rate of the crystal fiber 76 with respect to blue light is lowered. Therefore, the intensity of the blue light increases, and the intensity of yellow light and red light decrease accordingly. Then the white light generated by the white light source comprises higher color temperature.

Figure 8:
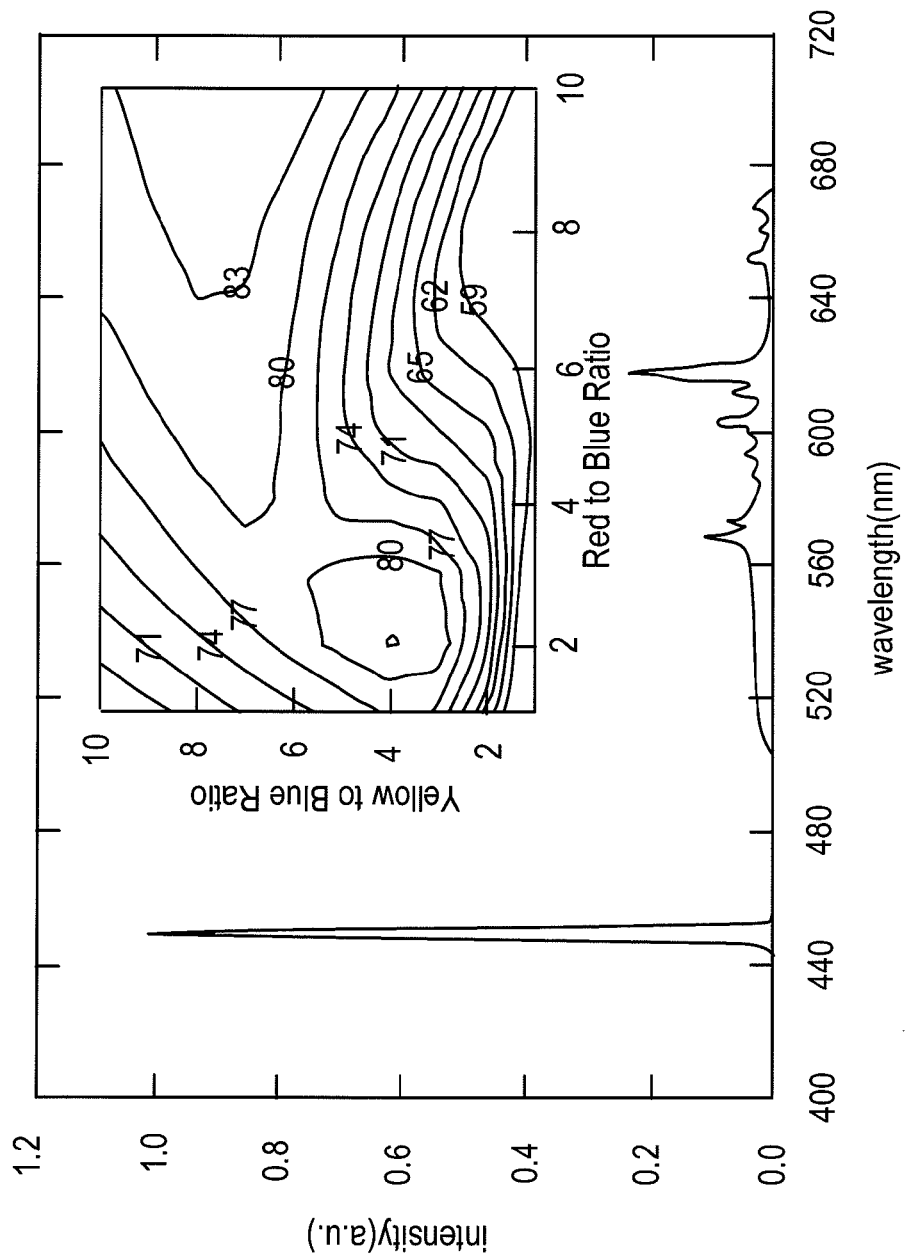
FIG. 8 is an output spectrum diagram of the white light source with crystal fiber in accordance with one embodiment of the present invention and a relationship diagram of color rendering index thereof.

Referring to FIG. 8, there is shown an output spectrum diagram of the white light source with crystal fiber in accordance with one embodiment of the present invention and a relationship diagram of color rendering index thereof. As illustrated in this figure, some proportion combinations among each color light generated by the white light source with crystal fiber of the present invention provide white light with high luminance and high CRI. It is preferred that the area under the spectral curve within the yellow wavelength range is larger than or equal to six times that within the blue wavelength range, and the area under the spectral curve within the red wavelength range is larger than or equal to seven times that within the blue wavelength range. In this case, a white light with a high CRI of more than 83 can be obtained.

To ensure that the white light is generated with high luminance, the area under the spectral curve within the yellow wavelength range should be smaller than or equal to twenty times that within the blue wavelength range. In an appropriate condition, the luminance of a white light generated according to the present invention can be up to $2.56 \times 10^{10}$ cd/m$^2$.

To obtain the aforementioned area under the spectral curve of each color light, the spectral curves of each color light is firstly obtained by Gaussian fitting with respect to each color light, and then the area of each spectral curve is calculated by integrating with respect to the wavelength. The detailed experiment process and data analysis are referred to the attachment "High-Brightness White Light Point Source using Ce,Sm:YAG Crystal Fiber", Yen-Sheng Lin et al, 2009 Optical Society of America, JTHE39.pdf.

The present invention is not limited to the above-described embodiments. Various alternatives, modifications and equivalents may be used. Therefore, the above embodiments should not be taken as limiting the scope of the invention, which is defined by the appending claims.

What is claimed is:

1. A method for color temperature tuning of white light source with crystal fiber comprising the steps of:
   providing a pumping source for generating a first-color light;
   providing a crystal fiber for absorbing a portion of said first-color light and generating a second-color light and a third-color light, wherein said first-color light, said second-color light, and said third-color light are mixed to form a white light;
   providing a gradient index lens for focusing said first-color light on the end section of said crystal fiber; and
   adjusting the position of the focus of said first-color light on the end section of said crystal fiber so the color temperature of said white light can be tuned.

2. The method for color temperature tuning of claim 1, wherein said crystal fiber is a crystal fiber made of a first rare earth element oxide and a second rare earth element oxide co-doped yttrium aluminum garnet.

3. The method for color temperature tuning of claim 2, wherein said first rare earth element oxide and said second rare earth element oxide are each selected from the group consisting of: cerium oxide, praseodymium oxide, samarium oxide, europium oxide, and terbium oxide.

4. The method for color temperature tuning of claim 3, wherein said pumping source is selected from one of the followings, a frequency doubling laser, a laser diode, or a light-emitting diode.

5. The method for color temperature tuning of claim 3, wherein said crystal fiber is selected from one of the followings, a single cladding crystal fiber or a double cladding crystal fiber comprising a core and at least one cladding.

6. The method for color temperature tuning of claim 5, wherein the concentration of first rare earth ions and second rare earth ions from said first rare earth element oxide and said second rare earth element oxide decreases gradually and outwardly from the axis of said crystal fiber.

7. The method for color temperature tuning of claim 1, wherein said first-color light, said second-color light, and said third-color light are blue light, yellow light, and red light, respectively.

* * * * *